Aug. 14, 1962
W. E. DU VALL
3,049,623
AUXILIARY POWER SUPPLY
Filed March 30, 1961
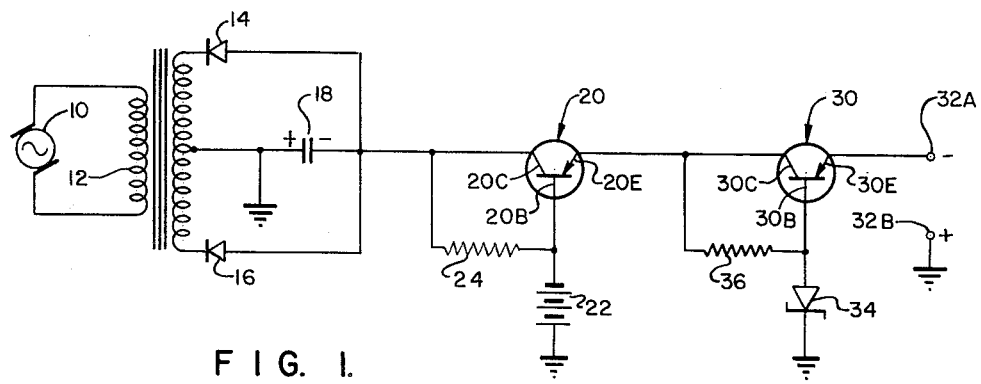
FIG. 1.
FIG. 2.
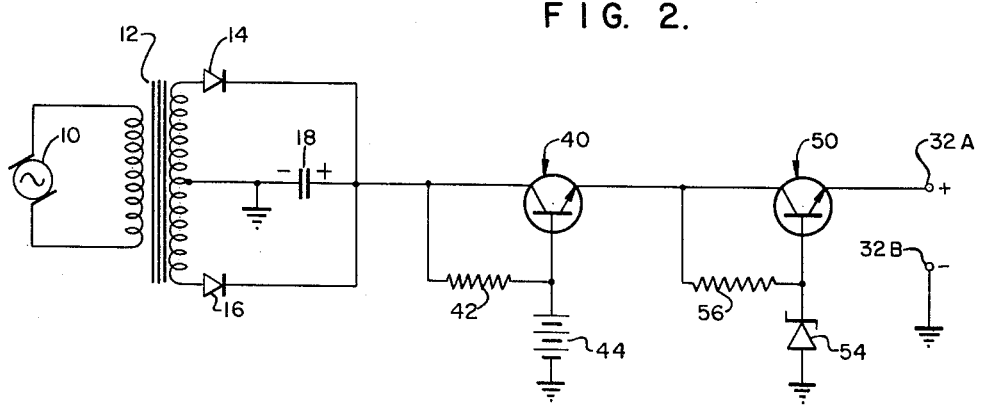
WILBUR E. DU VALL
INVENTOR.
BY
ATTORNEYS United States Patent Office 3,049,623
Patented Aug. 14, 1962

3,049,623
AUXILIARY POWER SUPPLY
Wilbur E. Du Vall, Gardena, Calif., assignor to The W. W. Henry Company, Huntington Park, Calif., a corporation of California
Filed Mar. 30, 1961, Ser. No. 99,530
5 Claims. (Cl. 307—66)

This invention relates to power supplies and, more particularly, to an improved arrangement for auxiliary power supplies.

As is well known, the purpose of an auxiliary power supply is to maintain power whenever there is a failure on the part of a main power supply. Numerous arrangements for switching in an auxiliary power supply in such instances are well known. However, there are a considerable number of electronic circuits which are adversely affected by any switching transients or by any delay time required when going from a main to an auxiliary power supply, as happens with presently known arrangements.

An object of this invention is to provide an auxiliary power supply which is instantaneously available without delay time.

Another object of this invention is to provide an auxiliary power supply arrangement wherein there are no switching transients.

Yet another object of this invention is to provide a novel, simple, and useful arrangement for switching an auxiliary power supply into operation upon the failure of the main power supply.

These and other objects of this invention may be achieved by an arrangement wherein a transistor is inserted between load terminals and the usual rectifier circuits used for converting alternating current to direct current. More specifically, the collector and emitter of the transistor are in series with the line going to the load. A battery is connected between the base of the transistor and the return line. Any suitable arrangement may be connected between the output of the rectification circuitry and the battery for maintaining the battery in a charged condition.

The battery biases the transistor so that it can conduct the current from the rectifier to the load. The battery is maintained under charge conditions, if a rechargeable battery is desired. When for some reason the main supply source fails, the battery can supply the load current through the emitted-to-base junction of the transistor. This diode junction is always forward-biased, and therefore the output voltage will remain substantially at the required load voltage.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a circuit diagram of an embodiment of the invention employing a PNP transistor; and FIGURE 2 is a circuit diagram of an embodiment of the invention employing an NPN transistor.

Referring now to FIGURE 1, there may be seen a circuit diagram of an embodiment of the invention. An alternating-current source 10 supplies voltage to the primary of a power transformer 12. This power transformer 12 has connected to its secondary windings a first and second rectifier, respectively 14, 16. These are poled so that their output is negative. The center tap of the transformer is connected to ground. Between the ground and the output of the two rectifiers 14, 16 there is placed a filter capacitor 18. The circuitry described thus far is the conventional rectifier circuitry for deriving a direct current from a source of alternating current.

A PNP transistor 20 has its collector 20C connected to the negative output side of the rectifier circuits and its emitter 20E to the load side of the line. A battery 22 is connected between the base 20B of the transistor 20 and ground. The battery is maintained charged by current flowing through a resistor 24, which is connected to the output of the rectifier circuitry and the negative side of the battery which is connected to the base 20B.

The battery 22 supplies the reference voltage to the base of the transistor 20. Base current for the transistor is supplied through the resistor 24. If the battery 22 is a rechargeable battery, as stated above, a trickle charge is also supplied to the battery through the resistor 24. The value of the resistor 24 determines the trickle charge of the battery. Since the battery voltage supplies a base current $V_B$ (current from base to emitter of the transistor 20), the emitter-to-base diode junction is forward-biased. Therefore, the output voltage $V_L$ across terminals 32A, 32B will be slightly less than the battery voltage. When the alternating-current power source 10 fails for some reason, the battery 22 will supply the load current through the emitter-to-base junction of transistor 20. This diode junction is always forward-biased, and thus the output voltage will remain at $V_L$. Therefore, there is no change in the load voltage $V_L$ when the alternating-current source 10 is removed. As the battery discharges, the voltage $V_L$ will follow the battery voltage.

In order to avoid $V_L$ following the battery discharge curve and to keep the output voltage constant over the full discharge curve of the battery, a regulator stage may be added, if desired. This includes a transistor 30, having its collector 30C connected to the emitter 20E and its emitter 30E connected ot the load terminal 32A. A Zener diode 34 is connected between the base of transistor 30 and ground. A resistor 36 is connected between the collector of the transistor 30 and its base. The regulator circuit including transistor 30 and Zener diode 34 is conventional. Any other desired type of regulator circuit may be employed here. It should be stressed, however, that the auxiliary power supply, comprising the battery 22, is switched onto the line at the instant that the alternating-current source 10 fails or is disconnected. Further, such switching occurs without any transients usually associated with closing a relay contact or suddenly rendering conductive a tube or diode which is nonconductive.

FIGURE 2 shows an arrangement employing the invention which uses an NPN transistor instead of a PNP transistor. It will be appreciated that all that has to be done is to reverse the polarities of the various elements in the circuit in order to accommodate an NPN transistor in place of a PNP transistor. Elements in FIGURE 2 which function in the same manner as described in FIGURE 1 will have the same reference numerals. Thus, the alternating-current source 10 is coupled to the primary of a transformer 12. The secondary of the transformer is connected to a pair of rectifiers 14, 16, which are poled so that their output is positive. The center tap of the transformer secondary winding is connected to ground. Between the output of the rectifiers 14, 16 and ground there is connected a filter capacitor 18. An NPN transistor 40 has its collector connected to the output of the rectifier circuit and its emitter connected to the line going to the load. A resistor 42 is connected from the collector to the base of the transistor 40. A battery 44 performs the same function for transistor 40 as does the battery 22 for transistor 20. A transistor 50 has a Zener diode 54 connected between its base and ground. Its collector is connected to the emitter of transistor 40, and its emitter is connected to the output terminal 32A.

A resistor 56 is connected between the collector and base of the regulating transistor 50.

The circuit shown in FIGURE 2 functions identically to the circuit shown in FIGURE 1 to switch in the auxiliary battery 44 when the main power source 10 fails. As previously indicated, the sole change in the circuitry comprises the use of NPN transistors instead of PNP transistors.

There has accordingly been described and shown herein a novel, useful, and simple arrangement for connecting an auxiliary power supply to a load without transients or loss of time due to the switching operation. Although the rectifier circuit supplied by an alternating-current source is shown in the drawings, it will be apparent that this may be replaced by any other power supply whose output it is desired to maintain by an auxiliary power supply. Although a regulator is shown being used for compensating for battery-voltage change, it need not be used where the battery may only be called upon for short interval service, so that it is not appreciably discharged.

I claim:

1. In a circuit wherein voltage is supplied to load terminals from a power supply having a positive and negative output terminal, an arrangement for connecting an auxiliary supply to the load terminals upon failure of the power supply comprising a transistor having emitter, collector, and base electrodes, means connecting said collector to one of said power-supply output terminals, means connecting said emitter to one of said load terminals, an auxiliary power supply, means connecting said auxiliary power supply between the base of said transistor and the other of said load terminals, and a resistor connected between the collector and base of said transistor.

2. The circuit arrangement in Claim 1 wherein said transistor is of the PNP type, its collector is connected to a negative output terminal of said power supply, and said auxiliary power supply comprises a battery having positive and negative terminals, said battery having its negative ouput terminal connected to the base of said transistor and its positive output terminal connected to the positive output terminal of said power supply.

3. The circuit as recited in claim 1 wherein said transistor is of the NPN type and has its collector connected to the positive output terminal of said power supply, and said auxiliary power supply comprises a battery having positive and negative terminals, said battery having its positive terminal connected to the base of said transistor and its negative terminal to the negative output terminal of said power supply.

4. A fail-safe power supply comprising a source of direct-current voltage having a positive and negative output terminal, a transistor having a collector, emitter, and base, means connecting said transistor collector to one of said positive and negative output terminals, a pair of load terminals, means connecting said transistor emitter into one of said pair of load terminals, a resistor connected between the collector and base of said transistor, a battery connected between said transistor base and the other of said load terminals, said battery being connected in a manner to bias said transistor in a conducting state, and means connecting said other of said load terminals to the one of said positive and negative output terminals of said power supply to which said transistor is not connected.

5. The circuit recited in claim 4 wherein a voltage regulator is connected between said transistor emitter and said load terminal for compensating for changes in voltage occurring when said battery provides load current.

References Cited in the file of this patent

UNITED STATES PATENTS

| | | |
|---|---|---|
| 2,986,654 | Gunning | May 30, 1961 |
| 3,002,105 | Cady | Sept. 26, 1961 |